| United States Patent [19] | [11] | 4,075,018 |
|---|---|---|
| Custer | [45] | Feb. 21, 1978 |

[54] MOTION PICTURE FILM, SOUNDTRACK AND METHOD FOR PRODUCTION THEREOF

[76] Inventor: Peter Anderson Custer, Newtown, Bucks County, Pa. 18940

[21] Appl. No.: 585,164

[22] Filed: June 9, 1975

Related U.S. Application Data

[63] Continuation-in-part of Ser. No. 375,812, July 2, 1973, Pat. No. 3,926,633.

[51] Int. Cl.² .................. G03C 5/14; G03C 1/76; G03C 1/84
[52] U.S. Cl. .................................. 96/39; 96/4; 96/68; 96/84 UV
[58] Field of Search .............. 96/4, 39, 67, 68, 84 UV

[56] References Cited

U.S. PATENT DOCUMENTS 3,819,372  6/1974  Newman et al. ..................... 96/74

Primary Examiner—Mary F. Kelley
Attorney, Agent, or Firm—Fidelman, Wolffe & Waldron

[57] ABSTRACT

A motion picture film having a soundtrack which is visible light-transparent, but fluoresces in the visible spectrum when submitted to ultra-violet radiation, and unexposed film for providing the product, and the method for producing the exposed and unexposed films including such soundtrack.

26 Claims, 4 Drawing Figures

U.S. Patent  Feb. 21, 1978  4,075,018
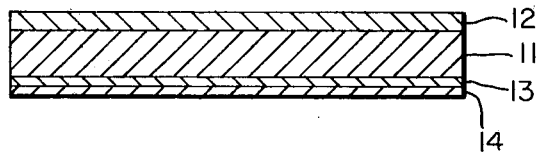
FIG. 1
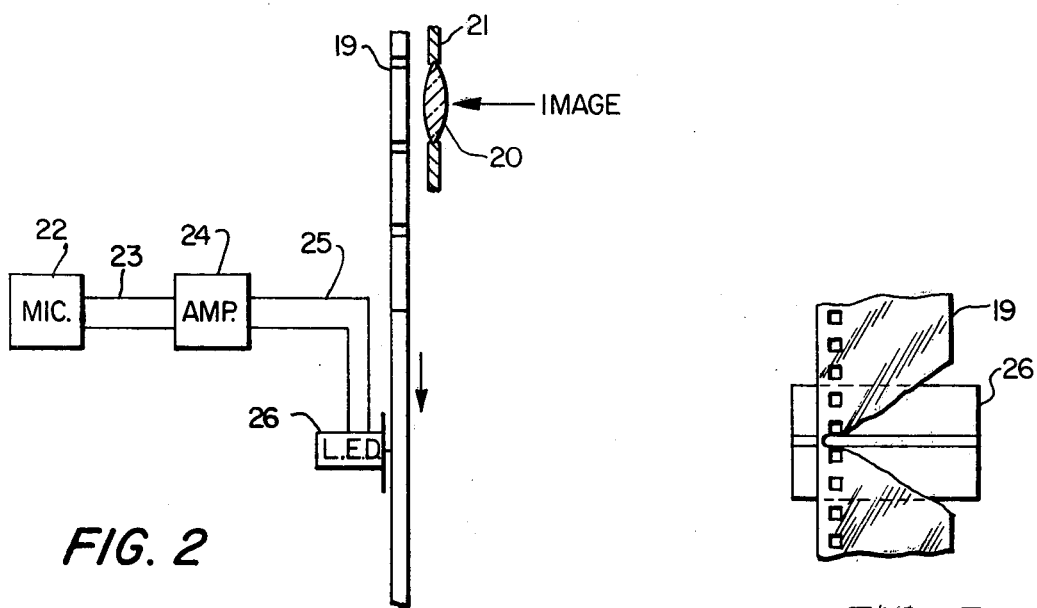
FIG. 2
FIG. 3
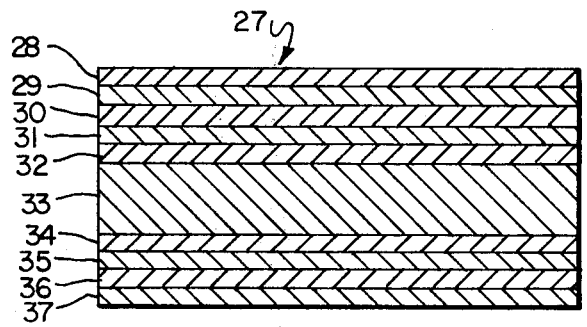
FIG. 4

MOTION PICTURE FILM, SOUNDTRACK AND METHOD FOR PRODUCTION THEREOF

CROSS-REFERENCE TO RELATED APPLICATION

This application is a continuation-in-part of application Ser. No. 375,812, filed July 2, 1973.

BACKGROUND OF THE INVENTION

The present invention is directed to a motion picture film wherein a layer containing a colorless, transparent ultra-violet light sensitive soundtrack is provided on one side of the film. The soundtrack covers the whole of either the front or back of the film and may be either variable density or vairable area type. The present invention is further directed to the use of a second emulsion to record a soundtrack on a film and the subsequent development thereof to produce a soundtrack which is substantially colorless and transparent to visible light, but fluoresces in the visible light spectrum when exposed to ultra-violet light.

Generally, in the prior art it has become standard procedure to provide a magnetic or optical recording track on the edge of a film adjacent the image when producing sound in motion pictures. However, this system is quite cumbersome since the provision of the soundtrack is an operation that is separate from the recording and developing operation. The width of the track, on the other hand, is a further limiting factor since it can only be on an area not covered by the photographic image, and thus must be very narrow due to the width of the film. Further, when utilizing narrow films such as those that have become quite popular for amateur movie makers, e.g., the "Super-8" films, there is not sufficient space on the film to provide a reasonable soundtrack which has good signal to noise ratio, frequency response and high information density. The present invention, on the other hand, provides a film and a method of using such film that admits of recording the sound on the full width of a film, especially on 8-millimeter film, and thus provides improved reproduction of the sound.

In U.S. Pat. No. 3,379,095 it was suggested that a filmstrip have the sound recording over the picture thereof. However, in the method suggested therein, a complex light-dividing system was necessary in order to provide both sound and image. Further, the materials utilized therein, although being transparent to visible light, were opaque to infra-red radiation and thus required the light-splitting techniques. The present invention, on the other hand, overcomes the expensive additional equipment required by such a system. These infra-red opaque coatings have to be placed on the film after the development thereof and do not appear to be applicable to almost simultaneous picture and sound recording. Thus, the process of the patent requires two steps to complete the recordings and requires additional equipment expenditure.

Further it is known to use various light systems, e.g. the system shown in U.S. Pat. No. 1,928,329 to Oswald et al, and U.S. Pat. Nos. 3,508,015 and 3,522,388 to Miller. However, these systems apparently do not recognize the possibility of recording both sound and images on the same film. The patent to Oswald uses a black and white film and visible light through a lens to provide the sound system while the patents to Miller utilize light emitting diodes of varying types. The systems thus suffer from the same lack of ease of good sound reproduction present in the magnetic strip type of sound recording.

Further, the art generally accomplishes multiple sound source effects by using separate, but synchronously run, film strips or magnetic tape. These systems present serious technical problems such as maintaining both sound and film image synchronization between the two separately run systems. This film may be of the standard 16mm, 35 or 70mm size. There is at present usually only room for one channel of sound on the rebate edge next to the image area of these commercial films. In the present invention and use, one or a plurality of soundtracks containing a transparent, substantially colorless ultra-violet fluorescent material are superimposed over the actual image area. One ultra-violet soundtrack exciter source may serve to energize, or cause to fluoresce all of the soundtracks, but each track must be read out by a separate photosensitive cell. Instead of having one soundtrack layer covering the entire area of the film, where plurality of soundtracks are contemplated, a number of soundtracks in strips across the surface of the film may be employed.

Thus, it is an object of the present invention to provide a film which may be first exposed to visible light to produce a photographic image and then almost simultaneously exposed to infra-red radiation or other selected portion of the spectrum to produce a soundtrack on the exposed film.

A further object of the present invention is to provide a finished film that has sound recording on the full width thereof and requires only a minimum of extra equipment to reproduce this sound.

Another object of the present invention is the provision of a high gain, high signal to noise ratio, variable density or variable area soundtrack.

It is an even further object to provide a simple method of reproducing sound on motion picture film which admits of recording by amateur photographers.

A further object of the invention is to provide means for the recording of multiplicity of synchronized soundtracks or channels on a single motion picture film release print and thus create, in the theatre, sterophonic or quadraphonic sound effects.

A still further object of the invention is to provide retrieval instructions on film to be used in automatic information retrieval systems, the filing instructions being placed over the useable image area of microchips and the like in a second emulsion which develops to become a transparent, colorless, ultra-violet, fluorescent material, and thus retrieval instructions do not obscure or use space that would otherwise be available for the recording and storage of other data.

SUMMARY OF THE INVENTION

The present invention is directed to black and white or color photographic films having additionally coated thereon an emulsion of visible light insensitive material. This film is used by first exposing it in a normal manner to the desired image and then almost simultaneously exposing the visible light insensitive emulsion, e.g. when using an infra-red sensitive emulsion, to infra-red light emitted from a light-emitting diode of a selected type, to provide the soundtrack. The film, after these two exposures, may be then developed in what is almost a normal manner to provide the visual images, while the soundtrack portion is developed substantially with a colorless, visible light-transparent ultra-violet light sensitive, visible light-emitting compound. In the alternative, an ultra-violet light sensitive dye or other fluorescent, transparent and substantially colorless material may be contained in the soundtrack producing emulsion, and the development thereof affected by washing the unexposed areas off of the layer. In both methods, the silver image formed in the soundtrack layer is bleached out so that the soundtrack layer is transparent. The actual development procedure used may be varied as desired, e.g. separate steps or a combined process, so long as the film product has both the usual images and the transparent colorless UV sensitive soundtrack.

DESCRIPTION OF THE DRAWINGS

The following Figures will serve to schematically illustrate one embodiment of the present invention:

FIG. 1 is a cross-section of the film of the present invention in the unexposed state;

FIG. 2 is a schematic of the exposure system of the present invention; and

FIG. 3 is a partially sectionalized view of the sound recording system of the present invention.

FIG. 4 is the cross-section of another embodiment of the film.

DESCRIPTION OF THE PREFERRED EMBODIMENTS

FIG. 1 shows a normal black and white or color film having a base 11 which may be of any usual material such as polyethylene tetephthalate and a visible light-sensitive emulsion 12 which may be either black and white or color. That is, the present invention is adaptable for either black and white films or color films. Further, the particular type of development required, such as dye coupling, etc., is not critical. That is, the film of the present invention may have any desired light-sensitive emulsion coated thereon. Most commonly the usual silver halide emulsion, either black and white or color types, will be employed. The film shown in FIG. 1 has an anti-halation layer 13, and coated on the back thereof, the unexposed emulsion of the present invention. This soundtrack forming emulsion 14 may be a silver halide in gelatin emulsion and the selected portion of the spectrum sensative material, e.g. the visible light portion or infra-red light-sensitive material discussed below. Additionally, a light absorber corresponding to the portion of the spectrum employed in producing the soundtrack, e.g., an infrared light absorber, may be present between the base and emulsion 14.

Although it is preferred that the sound emulsion be on the back of the film, it is also possible to put this emulsion on the front, i.e. overcoat the visible emulsion with the sound emulsion. The provision of the sound emulsion on the same surface as the image emulsion requires special processing since, e.g. development requiring transfer of material through the sound emulsion could create a loss in quality of sound reproduction. Both locations of the soundtrack emulsion on the film, e.g. on the back thereof and on the same surface as the image emulsion, are encompassed in the phrase "the soundtrack is superimposed over the photographic image area." Thus, while any processing compatible with the original sound recording emulsion and the final UV sensitive dye containing soundtrack may be utilized for developing the soundtrack on the back of the film (such as dye coupling, etc.) when the soundtrack is coated over the image producing emulsion, the developed image surface should be smooth so that no sound distortion problems would arise.

The image producing emulsion used in the present invention may be provided by numerous methods, one of these being the process for high speed laying of gelatin coatings disclosed in U.S. Pat. No. 3,617,292. Further, the emulsions are those known in the art and include emulsions such as the high contrast emulsion of U.S. Pat. Nos. 3,625,689 and 3,635,715. Also, anti-halation and subbing layers useful in the conventional portions of the film of the present invention are those presently in use. An exemplary subbing layer can be found in U.S. Pat. No. 3,645,740. The present invention, on the other hand, resides in the provision and use of an emulsion coating that is insensitive to visible light, but capable of recording signals from a light source other than one emitting visible light or from a selected portion of the spectrum, and which can be developed with a material which fluoresces in the visible light spectrum when subjected to ultra-violet light, or alternatively the emulsion contains ultra-violet fluorescing material and the unexposed portions are removed in development. When the visible image layer is of the usual color image forming type, the yellow dye present, which is blue light absorbing, effectively serves to screen or black out the blue light which would expose the silver halide emulsion of the soundtrack layer. If the visible image layer is of the black and white silver image forming type, a suitable screening or black layer is interposed between the visual image layer and the soundtrack layer to prevent any exposure of the soundtrack by any visible light that passes through the camera optical system. During development, this screening layer is removed.

In FIG. 2, the process of the present invention is illustrated. In this system, the film (indicated generally as 19) is exposed through lens 20 in the camera indicated generally as 21. Simultaneously the sound associated with the image is picked up by microphone 22, transmitted by lines 23 to optional amplification system 24 and then by wires 25 and diode 26. The output of diode 26 is used to expose the soundtrack emulsion. This exposure is effected at a point on the film that has been previously exposed to visible light, e.g. 24 frames ahead of the associated visual image in 8mm films. Additionally, in use a sound loop is needed to utilize the film since the intermittent motion of the film during recording would make sound recording impossible. Thus, a film having a visual image spaced 24 frames behind the sound associated with it is produced. This spacing can be used in the visual and sound reproduction of the films since it allows spacing between the audio and visual reproducing means in a projector. The type of amplification system utilized depends on the type of diode selected. That is, if the microphone in conjunction with a single stage amplifier provides sufficient voltage to drive diode 26 in the linear area, then no further amplification is necessary. However, if this is not the case, a more powerful amplification circuit may be provided at 24. Power for the amplification system can easily be provided by the power source for the camera. The diodes useful in the practice of one embodiment of this invention are infrared emitters such as gallium arsenide and a structure therefor may be found in U.S. Pat. No. 3,522,388 cited above. Further, light emitting diodes including split projection diodes and those of the general types shown in U.S. Pat. Nos. 3,293,513 and 3,576,586 may be utilized in the present invention as well as lasers. However, other diodes and light energy sources may be utilized which radiate in the visible or invisible spectrum. Obviously, the sensitivity of the soundtrack emulsion used is determined by, e.g. the diode used and the infra-red sensitive sound emulsions being used in combination with infra-red and selected portions of the spectrum emitters. Further, the structure controlling the characteristics of the diode output in the sound reproduction portion of the present invention may be the type producing a variable area output or a variable density output. The variable area recording produces a light pattern that varies with the signal's characteristics, while variable density recordings have a varying intensity of recording signal over a fixed area. The diode is in proximity to the film and the synchronization of the soundtrack recording and visible light recording is done for example, be gear and electronic means, not shown. An exemplary structure for this system may be found in applicant's copending application Ser. No. 375,638, filed July 2, 1973 and entitled "Motion Picture Camera, Cartridge and Data Recording System", now U.S. Pat. No. 3,876,296.

Additionally, visible light emitting diodes may be utilized in the recording step if a blocking layer is used between the image emulsion and the sound emulsion to prevent exposure of the sound emulsion during image recording and vice versa. In this form, the sound emulsion is on the opposite side of the film and a temporary, visible light absorbing dye layer is placed between the film base and the sound emulsion. This dye is removed, e.g. by bleaching it out during development. Thus the important feature of the sound emulsion is that it be adaptable to recording of the sound without interfering with, or being interfered with by the visual image emulsion recording step.

FIG. 3 shows a partial section of the system wherein film 19 passes in front of diode 26 and has the sound "image" recorded thereon. In a typical system, the sound recording is done at a point 24 frames away from the image recording. Thus a given image has associated therewith the sound for a frame which would be shown on the motion picture screen 24 frames later. Thus the recording of both the image and the sound may be synchronized for use in a motion picture projector.

able area or variable density sound recording effected thereon hardens the gelatin emulsion allowing development by washing the unexposed emulsion off the film. An exemplary system is that known as the tanning developer which hardens the emulsion by e.g. oxidation of pyrocatechin.

These optical brighteners are essentially colorless, ultra-violet light sensitive and visible light fluorescing and are transparent to visible light. When the dye is present on the back of the film, it appears that the final concentration in the dry emulsion should be from about 0.01 to 0.20 by weight based on the coating solids. Preferably, however, the dye is present in an amount of from 0.05 to 0.15% and it appears most preferable to have the dye concentration about 0.14%. However, the concentration can vary outside of these limits depending on such factors as dye fluorescent efficiency. The only requirement is that the dye fluoresce with sufficient intensity to allow easy discrimination by e.g. a photoelectric cell. All of these percentages are by weight based on the coating. These coatings are the normal thickness, i.e. from about 0.0001 to about 0.0005, preferably about 0.0002 to about 0.0004 inches and are made from normal emulsions such as silver halide gelatin emulsions. Exemplary emulsions include those known throughout the art. A relatively full study of the photographic skill needed to produce the process and product of the present invention, as to the known components, can be found in "The Theory of the Photographic Process" by C. E. Kenneth Mees, Revised Edition 1954, published by MacMillan, which disclosure is herewith incorporated by reference. The soundtrack emulsion may include e.g. any known visible light sensitive material and infra-red sensitive material, while the ultra-violet sensitive materials of the present invention include the Leucophore series produced by Sandoz, Inc. Exemplary of these leucophore dyes are Leucophore B WS, PAF, EFR, and BSB. These dyes are what are commonly known as "optical brighteners" utilized to increase the apparent whiteness of certain materials caused by their ultra-violet sensitive, visible light fluorescing characteristics.

Leucophore B, which has the formula

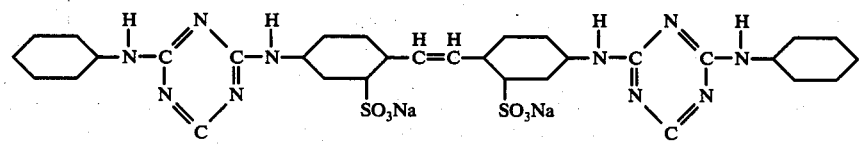

After exposure, the film of the present invention is then developed in accord with known techniques as to the visible image. However, these development processes must be so limited that they do not interfere with the development and dye formation in the soundtrack. The soundtrack, on the other hand, after exposure is developed by normal known techniques, e.g. in developing and fixing baths, and the soundtrack formed by using any substance with the property of being transparent and colorless in visible light, but fluorescent in the visible spectrum when exposed to ultra-violet light, and e.g. dyeing or dye coupling development processing.

In the alternative, an optical brightener or a colorless, transparent ultra-violet fluorescent material may be included in the soundtrack forming emulsion and a "wash off relief" process used. In this embodiment, the soundtrack emulsion includes the infra-red and selective portions of the spectrum sensitive material and the variis adsorbed on the gelatin in the photographic film, and is not leached out in washing steps. This property renders this dye particularly useful where a ultra-violet fluorescent material is incorporated in a layer which is to be subjected to leaching or washing steps and where it is desired that the fluorescent material not be removed.

Sensitizing emulsions to different portions of the spectrum and the dyes for accomplishing this end are discussed in the Mees test at pp. 354–421. Infra-red sensitizing materials are discussed at pp. 358,360,362 and 365. Exemplary compounds that may be used to provide the soundtrack of the present invention are (1) 3,3'-diethylthiatricarbo-cyanine iodide, (2) Neocyanine, (3) 1,1-diethyl-4,4'-tricarbo-cyanine iodide (xenocyanine), and (4) 12-acetoxy 3,3'-diethylthiatricarbo-cyanine perchlorate. All of these materials produce sensitivities between about 8000 and 10,000 A wavelengths and are infra-red sensitizers. In this form an IR absorber is needed between the two emulsions in the films of the present invention to protect the IR sensitive emulsion during exposure of the visible image producing emulsion. When using the IR sensitive layer, the material should be present in amounts of from about 0.001 to about 0.50% by weight, preferably about 0.001 to about 01.% by weight, based on the soundtrack producing emulsions solids content.

The film of the present invention may be used, for example, in a "Super 8" camera having included therein the infra-red emitting diode and sound amplification system and further having, in the cartridge thereof, as disclosed in the above noted application, a sound loop, a speed controlling means and the other necessary cartridge components. When used therein or in other motion picture films, both black and white and color film may be utilized and such films may be known types including, e.g. color reversal positive development, or dye adsorption films. Further, this system is adaptable for use in any other camera systems wherein sufficient space is available for the sound recording components of the present system. That is, they may be even used in the commercial films utilized in making motion pictures. In this light, the soundtracks of the present invention may be used in commercial films to provide plural soundtracks of very good characteristics. However, it should be noted that when the product of the present invention is to be duplicated the high speed of such duplicating processes requires the use of high intensity sound recording light. Thus, when an IR sensitive emulsion is used, an injection laser of the type known as an IR emitting gallium arsenide injection laser should be used. Additionally, the film of the present invention may be an X-ray film wherein the soundtrack thereof is utilized to provide other data on the patient being filmed.

While the embodiments described above have employed an infra-red sensitive silver halide soundtrack layer and wherein the soundtrack is produced by modulated infra-red light, it is possible to employ silver halide, sensitized by suitable dyes, to other portions of the spectrum, such as, for example, a blue light sensitive silver halide soundtrack emulsion. FIG. 4 shows a cross-section of a blue light sensitive, silver halide soundtrack emulsion film. Reference numeral 27 refers to the film. Layers 28, 29, 30, 31 are the respectively conventional color film blue sensitized emulsion, yellow filter, green sensitized emulsion, and red sensitized emulsion. Subbing layer 32 serves to adhere the emulsion to the support base 33, which is of any of the usual materials employed in photographic films. A UV absorber or quencher may be incorporated in base 33 to serve as an antihalation layer for the soundtrack, as will be discussed later.

On the underside of base 32 is a subbing coat 34, which functions in the same manner as 32. Below 34, layer 35 is located containing a blue light absorptive yellow dye which is removed during processing. Next is blue-light sensitive layer 36 wherein the UV fluorescent soundtrack images are formed; last is layer 37, the blue light transparent visual image anti-halation layer.

Blue light modulated by sound frequencies and amplitude is employed to expose the sensitive layer 36. As the modulated light source there may be employed lasers and light emitting diodes. Additionally, the modulation may be accomplished by the well-known method of a mirror oscillated by a galvanometer. In addition to the method involving direct exposure of the soundtrack layer to form soundtrack images, the layer may be printed on the silver halide layer 36 using a blue light source and a negative of a soundtrack previously produced. Due to the yellow dye layer in 35, the blue light passing through 36 is absorbed and does not penetrate the visual image layers 28, 30 or 31.

The soundtrack image formed in layer 36 is rendered fluorescent under UV by any of the methods previously indicated, e.g. a colorless UV fluorescent dye may be incorporated in the developing step after the blue light sensitive emulsion is exposed and fluorescent dye image formed by dye absorption or by dye coupling. Alternatively the UV fluorescent colorless dye may be incorporated in soundtrack layer 36 which after exposure is then developed by the "tanning process", wherein the unexposed portion is removed and the exposed portion is "tanned" and remains behind. Subsequent to the step where the image has taken up the UV dye, the silver image formed during the exposure is bleached, leaving a visible light-transparent and UV light-fluorescent image.

While the mode of recording soundtrack images has been described employing silver halide emulsions sensitized to IR and blue light, it is apparent that the same concept may be employed with silver halide emulsions sensitized to other portions of the spectrum, including the ultra-violet. Since the function of the layers in the film in this broader aspect are the same as in the infrared and blue light sensitive sound layer emulsions, FIG. 4 may be employed to describe this broader concept.

Corresponding to the layers shown in FIG. 4, 37 is an anti-halation layer for the visual image portion of the film. This is transparent to the color or portion of the spectrum for which the emulsion in layer 36 is sensitized. In the case of UV or blue light used as the sound modulated wave energy employed to form the soundtrack image, no sensitizers are necessary for the silver halide. Layer 36 contains the specific spectrum portion sensitized emulsion. If necessary, a yellow dye layer to filter out blue light may be incorporated in the anti-halation layer 37, or added as a separate layer. Layer 35 is an adsorbent for the sensitizing color or portion of the spectrum to prevent the light from reaching any visual image silver halide emulsion of the film. In the case of ultra-violet employed as the sound modulated light the use of an ultra-violet absorber or quencher in the film base 33 serves to prevent exposure of the image layers by UV. The yellow filter may be omitted in this modification. Layer 28 to 34 are the same as described in connection with the blue-light sensitive soundtrack emulsion.

The following examples are included in the present invention as illustrative of the processes and products of the present invention. However, they are to be considered as illustrative only and not limiting thereon.

EXAMPLE I

Normal 8-millimeter color films are utilized, and the backs thereof are additionally coated with emulsions containing 0.5% of a commercially available infra-red sensitive material. This emulsion is then dried and exposed to infra-red light emitted by a biased gallium arsenide semiconductor. After exposure, the films are developed in baths containing an optical brightener in amounts of from 0.05 to 0.25% by weight. The resultant ultra-violet light sensitive sound recording produced the best light fluorescence when the solution contained above 0.14%, optical brighteners, i.e. the coating remains colorless, but had the maximum fluorescence.

EXAMPLE II

Emulsions containing from 0.001% to 1.00% Leucophore WS (a trademarked optical brightener available from Sandoz) were coated on glass sheets to determine optimum dye concentrations. The sheet with 0.14% dye thereon was found, by visual observation, to emit more visible light when subjected to ultra-violet radiation than coatings of higher and lower concentrations of optical brighteners.

EXAMPLE III

An 8-millimeter film having a previously provided normal black and white image forming emulsion is coated on the back with a gelatin in water emulsion containing about 0.10% by weight neocyanine, based on total solids, dried and exposed to both visible light and infra-red radiation from a gallium arsenide diode in a motion picture camera. The exposed film is then developed by developing, washing and fixing and the IR layer dyed with Leucophore WS (Trademark). The resultant sound reproduction is better than magnetic strip sound reproduction, is synchronized and has equivalent image reproduction.

A further aspect of the invention involves the use of ultra-violet light absorbers or ultra-violet fluorescence quenchers used together with ultra-violet fluorescent materials. A number of embodiments involving the use of such absorbers or quenchers and fluorescent materials which may be employed in imaging optical soundtracks are possible. These include:

1. A film similar to that in FIGS. 1 and 4 which is sensitive on the soundtrack side to a selected portion of the light spectrum, is exposed to a sound modulated light beam of the said spectrum portion. The soundtrack layer has the silver halide emulsion together with a UV fluorescer. The silver soundtrack image is developed using a tanning developer, whereby the exposed portions of the emulsions are hardened. Thereafter, the silver image is bleached out leaving the fluorescent compound in the hardened image. Thereafter the film is bathed with a solution of ultra-violet absorbers or quenchers. This suppresses the fluorescence of the UV fluorescent compounds in those areas of the film where the UV light absorbers or quenchers are absorbed, but not in other areas. Since absorption takes place only in the non-hardened portions, the UV fluorescence in these areas is eliminated leaving only the hardened soundtrack as fluorescent.

UV absorbers are known to the art and are employed in a number of fields such as additives to plastics to retard deterioration due to UV radiation. CYASORBS UV 9, 24 and 5411, made by American Cyanamide Company are efficient UV absorbers for this invention. The first two structurally are benzophenones and the latter compound is a benzotriazole. In place of UV absorbers, which are effective by nature of their resonant structure which absorbs the UV radiation, UV quenchers may be employed. These convert the UV fluorescence to heat energy. Compounds of this nature are employed in waste paper pulping, to quench any optical bleaches which may be present. One typical quencher which can be employed in this invention is CARTAREX FL, the trade name of a quencher compound made by the Sandoz Color & Chemical Co.

2. In this embodiment, which is a modification of (1) above, the soundtrack emulsion layer contains in addition to silver halide, both a UV fluorescer compound and a UV absorber or quencher. The latter two compounds are removable by leaching and the UV fluorescor is not, since the latter is adsorbed on the gelatin. After exposure, the soundtrack layer is developed by a tanning developer and the silver image then is bleached. Thereafter the film is leached to remove the UV absorber or quencher from the unexposed (and untanned) portion of the soundtrack layer, leaching behind the UV fluorescent material. The tanned sountrack layer resists the leaching process and both the fluorescent material and the UV absorber or quencher remain therein. On exposure to UV in the projector the unexposed portion fluoresces, leaving the soundtrack image dark. Since in this mode the area which fluoresces under UV is much greater, the electronic sound reproduction system can function more efficiently.

3. A third embodiment possible with this aspect wherein UV absorbers are employed is as follows: The soundtrack layer incorporates the silver halide emulsion. In the subbing layer there is incorporated a fluorescent material. After exposure the silver image is developed in a tanning developer and thereafter bleached. In a subsequent step the film is treated with a solution of UV absorber or quencher which is absorbed in the non-tanned portion but not in the exposed soundtrack, which acts as a resist. Since the subbing layer is insoluble in water and is non-adsorptive, the UV absorber or quencher does not affect it. On projecting UV light onto the film, the now transparent soundtrack will transmit the UV light, but the other areas of the soundtrack layer will absorb or quench the UV. The UV transmitted through the soundtrack image will strike the subbing layer containing the UV fluorescent material, which will then fluoresce, tracing out the soundtrack image.

What is claimed is:

1. A method for making an unexposed film containing a visual or photographic image portion and a sound image portion which comprises:
  1. forming the film by coating a flexible transparent base with at least one silver halide-containing photographic image-forming layer;
  2. adding to the film a screening or blocking layer which absorbs the radiation of at least a given portion of the light spectrum and which is optically transparent after the development of the film;
  3. adding to the film a separate silver halide-containing optical soundtrack image-forming layer overlying at least a portion of said photographic layer, whereby the soundtrack images will overlie the photographic images;
  4. said soundtrack image forming layer containing:
     a. from 0 to a relatively small amount of a sensitizing material effective to sensitize said soundtrack image-forming layer to the said given portion of the light spectrum as is absorbed in the screening or blocking layer; and
     b. a relatively small amount of a material which fluoresces under UV light;
  5. the said screening or blocking layer being interposed between the said photographic and soundtrack layers.

2. The method of claim 1 wherein a UV absorbing or blocking means is interposed between the soundtrack and photographic image portion.

3. The method of claim 1 which includes the further steps of:
 a. exposing the photographic layer to record a photographic image;
 b. exposing the soundtrack layer with said segment of the light spectrum to record sound signals;
 c. developing the photographic image;
 d. developing the soundtrack image;
 e. removing any unexposed portion of the soundtrack layer; and
 f. bleaching out the silver soundtrack image whereby the soundtrack is rendered colorless and transparent to visible light and fluorescent under UV light.

4. The method of claim 3 wherein the soundtrack layer is exposed by printing with a soundtrack negative.

5. The method of claim 1 wherein the sensitizing material which is added to the soundtrack layer is an infra-red sensitizing material.

6. The method of claim 5 which includes the step of adding an infra-red adsorbing layer interposed between the two silver halide emulsions.

7. The method of claim 6 wherein the photographic image layer is of the color image forming type.

8. The method of claim 7 wherein the UV fluorescent material is an optical brightener.

9. The method of claim 8 wherein the infra-red sensitizer added to the soundtrack image forming layer contains from 0.0001 to 0.50% by weight of an IR sensitive material selected from the group consisting of (1) 3,3'-diethylthiatricarbocyanine iodide, (2) Neo-cyanine, (3) 1,1'-diethyl-4,4'-tricarbocyanine iodide, and (4) 12-acetoxy-3,3'-diethylthiatricarbocyanine perchlorate.

10. The method of claim 5 which includes the further steps of:
 a. exposing the photographic layer to record a photographic image;
 b. exposing the soundtrack layer with sound modulated infra-red light to record sound signals;
 c. developing the photographic image;
 d. developing the soundtrack image;
 e. removing any unexpected portion of the soundtrack layer; and
 f. bleaching out the silver soundtrack image whereby the soundtrack is rendered colorless and transparent to visible light and fluorescent under UV light.

11. The method of claim 6 wherein the sensitizing material which is added to the soundtrack layer consists of a blue light sensitizing material.

12. The method of claim 11 wherein is included the step of adding a blue light adsorbing layer interposed between the soundtrack and photographic image silver halide emulsions.

13. The method of claim 12 wherein the photographic image layer is of the color image forming type.

14. The method of claim 13 wherein the UV fluorescent material is an optical brightener.

15. The method of claim 11 which includes the further steps of:
 a. exposing the photographic layer to record a photographic image;
 b. exposing the soundtrack layer with sound modulated blue light to record sound signals;
 c. developing the photographic image;
 d. developing the soundtrack image;
 e. removing any unexposed portion of the soundtrack layer; and
 f. bleaching out the silver soundtrack image whereby the soundtrack is rendered colorless and transparent to visible light and fluorescent under UV light.

16. The method of claim 15 wherein the soundtrack layer is exposed by printing with a soundtrack negative.

17. The method of claim 11 which includes the further steps of:
 a. exposing the photographic layer to record a photographic image;
 b. exposing the soundtrack layer with sound modulated UV light to record sound signals;
 c. developing the photographic image;
 d. developing the soundtrack image;
 e. removing any unexposed portion of the soundtrack layer; and
 f. bleaching out the silver soundtrack image whereby the soundtrack is rendered colorless and transparent to visible light and fluorescent under UV light.

18. A method for making a film containing a visual or photographic image portion and a sound image portion which comprises:
 1. forming the film by coating a flexible transparent base with at least one silver halide-containing photographic-image layer;
 2. adding to the film a screening or blocking layer which absorbs the radiation of at least a given portion of the light spectrum and which is optically transparent after the development of the film.
 3. adding to the film a separate silver halide-containing optical soundtrack, image-forming layer overlying at least a portion of the photographic image layer, whereby the soundtrack images will overlie the photographic images;
 4. said soundtrack image-forming layer containing from 0 to a relatively small amount of a sensitizing material effective to sensitize said soundtrack image-forming layer to the said given portion of the light spectrum as is absorbed in the screening or blocking layer.
 5. the said screening or blocking layer being interposed between said photographic and soundtrack layers;
 6. exposing the photographic layer to record a photographic image;
 7. exposing the soundtrack layer with said portion of the light spectrum to record sound signals;
 8. developing the photographic image;
 9. developing the soundtrack image in the soundtrack layer with a dye absorption or dye coupling development step wherein the dye is a colorless fluorescent dye;
 10. whereby a fluorescing soundtrack image in the soundtrack layer essentially colorless and transparent to visible light is produced.

19. The method of claim 18 wherein the photographic image is formed in a plurality of layers of the silver halide emulsion color type and the soundtrack forming layer is a silver halide emulsion.

20. The method of claim 19 wherein the sensitizing material which is added to the soundtrack layer is an infra-red sensitizing material an infra-red absorbing layer is interposed between the photographic and soundtrack silver halide emulsions, and the soundtrack layer is exposed with infra-red light.

21. The method of claim 19 wherein the sensitizing material which is added to the soundtrack layer is a blue light sensitizing material; a blue light absorbing layer is interposed between the photographic and soundtrack silver halide emulsions, and the soundtrack layer is exposed with blue light.

22. The method of claim 21 wherein the soundtrack layer is exposed by printing with a soundtrack negative.

23. The method of claim 19 wherein a UV absorbing means is interposed between the photographic and soundtrack silver halide emulsions and wherein the soundtrack layer is exposed with UV light.

24. The method of claim 18 wherein the material added to the soundtrack layer is an infra-red sensitizing material, an infra-red absorbing layer is interposed between the two silver halide emulsions, and the soundtrack layer is exposed with infra-red light.

25. An exposed and developed photographic film comprising a base;
- a visible silver image or color layer on said base;
- a soundtrack layer substantially colorless and transparent to visible light on said base and overlying at least a portion of said visible image layer;
- the said soundtrack layer containing soundtrack images which overlie the visible image layer;
- said soundtrack layer incorporating therein a material which is colorless and transparent under visible light and capable of becoming fluorescent under UV light;
- the said material being present solely in the soundtrack images, whereby said images are defined in the soundtrack layer and are rendered visible in UV light.

26. The article of claim 25 wherein the material in the soundtrack layer is an optical brightener.

* * * * *